Figure 1:
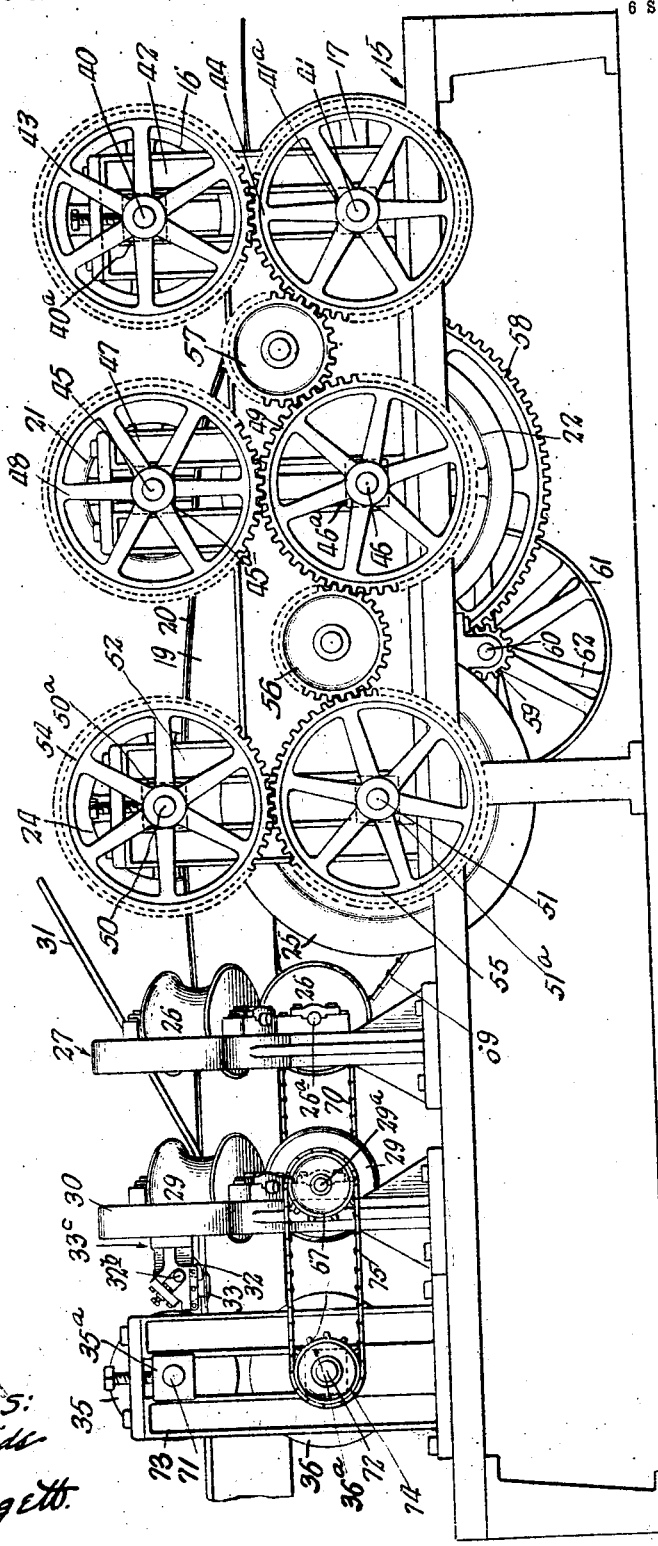

O. H. TAESCHNER & R. E. WIRTH.
PIPE FORMING MACHINE.
APPLICATION FILED JUNE 14, 1909.

1,032,634.

Patented July 16, 1912.
6 SHEETS—SHEET 1.

Witnesses:

Inventors
Otto H. Taeschner
Rudolph E. Wirth
by Poole & Brown
Attys

O. H. TAESCHNER & R. E. WIRTH.
PIPE FORMING MACHINE.
APPLICATION FILED JUNE 14, 1909.

1,032,634.

Patented July 16, 1912.

6 SHEETS—SHEET 3.

Witnesses:

Inventors:
Otto H. Taeschner
Rudolph E. Wirth
by Poole & Brown
Attys

O. H. TAESCHNER & R. E. WIRTH.
PIPE FORMING MACHINE.
APPLICATION FILED JUNE 14, 1909.
1,032,634.
Patented July 16, 1912.
6 SHEETS—SHEET 4.
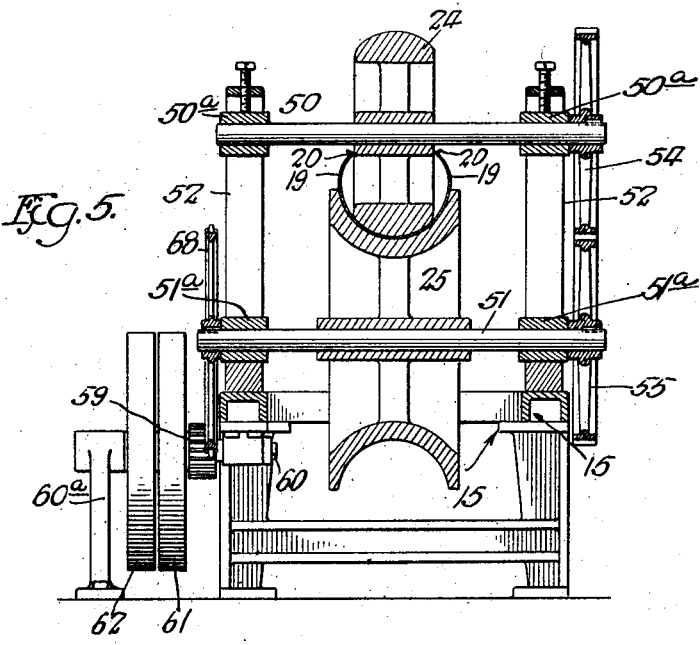
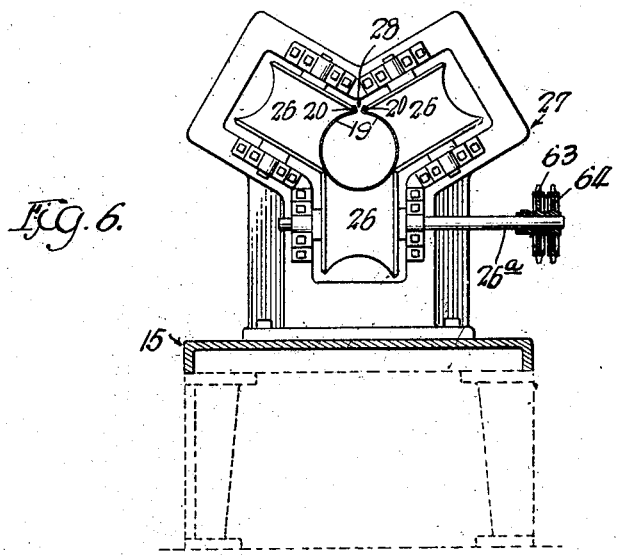

O. H. TAESCHNER & R. E. WIRTH.
PIPE FORMING MACHINE.
APPLICATION FILED JUNE 14, 1909.

1,032,634.

Patented July 16, 1912.

6 SHEETS—SHEET 5.

Witnesses:

Inventors:
Otto H. Taeschner
Rudolph E. Wirth
by Poole & Brown Attys

O. H. TAESCHNER & R. E. WIRTH.
PIPE FORMING MACHINE.
APPLICATION FILED JUNE 14, 1909.
1,032,634.
Patented July 16, 1912.
6 SHEETS—SHEET 6.
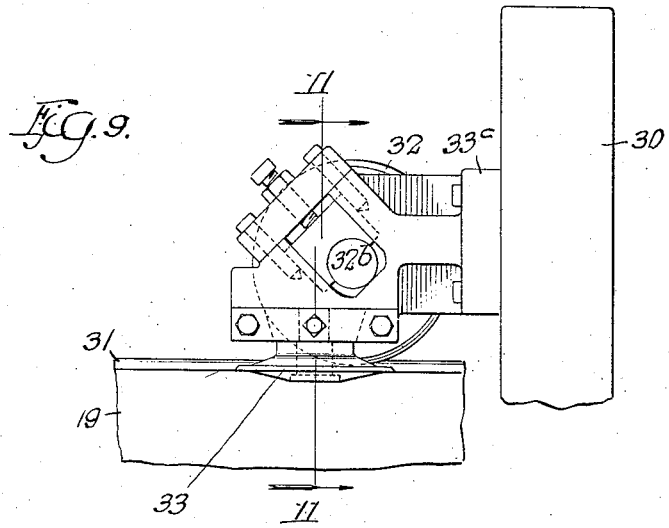
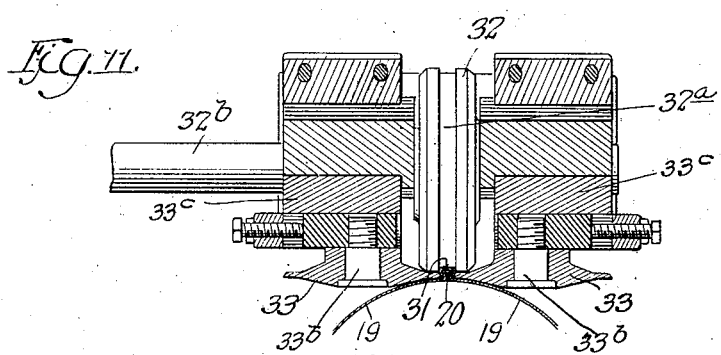
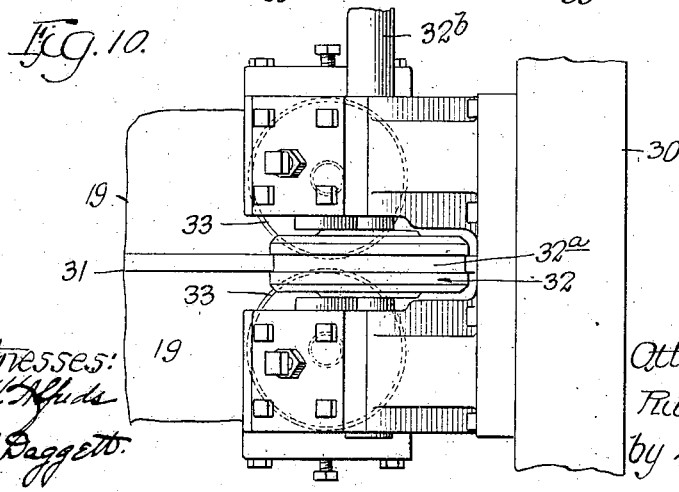
Witnesses:
T. W. Shields
J. N. Daggett.
Inventors:
Otto H. Taeschner
Rudolph E. Wirth
by Poole & Brown.
Attys

UNITED STATES PATENT OFFICE.

OTTO H. TAESCHNER AND RUDOLPH E. WIRTH, OF CHICAGO, ILLINOIS.

PIPE-FORMING MACHINE.

1,032,634.   Specification of Letters Patent.   Patented July 16, 1912.

Application filed June 14, 1909. Serial No. 502,078.

*To all whom it may concern:*

Be it known that we, OTTO H. TAESCHNER and RUDOLPH E. WIRTH, citizens of the United States, and residents of Chicago, in the county of Cook and State of Illinois, have invented certain new and useful Improvements in Pipe-Forming Machines; and we do hereby declare that the following is a full, clear, and exact description thereof, reference being had to the accompanying drawings, and to the letters of reference marked thereon, which form a part of this specification.

This invention relates to an improvement in machines for rolling pipes formed of sheet metal.

In the operation of the machine a sheet of metal, of a width to form the circumference of the pipe, is passed through successive sets of rollers which are arranged transverse to the length of the pipe, and act in succession upon sections of the pipe to first start curvature of the sheet of metal along its outer edges, to then extend this curvature farther toward the medial line of the sheet of metal, and to continue this process of bending the sheet transverse of its length to approximate the completed section of the pipe until, with the operation of the last set of rollers, it is delivered from the machine properly bent into final form. In the process of the formation of the pipe by thus bending the pipe-forming sheet transverse of its length, there are preferably formed at the opposite longitudinal edges of the sheet, oppositely disposed flanges which are brought together along the medial line of the upper surface of the pipe when it is bent to its final form. Just before the pipe is delivered from the machine a U-shaped strip is fed into position to embrace these flanges with its legs, and the machine is provided with tucking mechanism which tuck these legs under the flanges of the pipe so as to lock the edges of the pipe in position.

Our invention relates to the combination of parts hereinafter described and more particularly pointed out in the claims.

Figure 2:
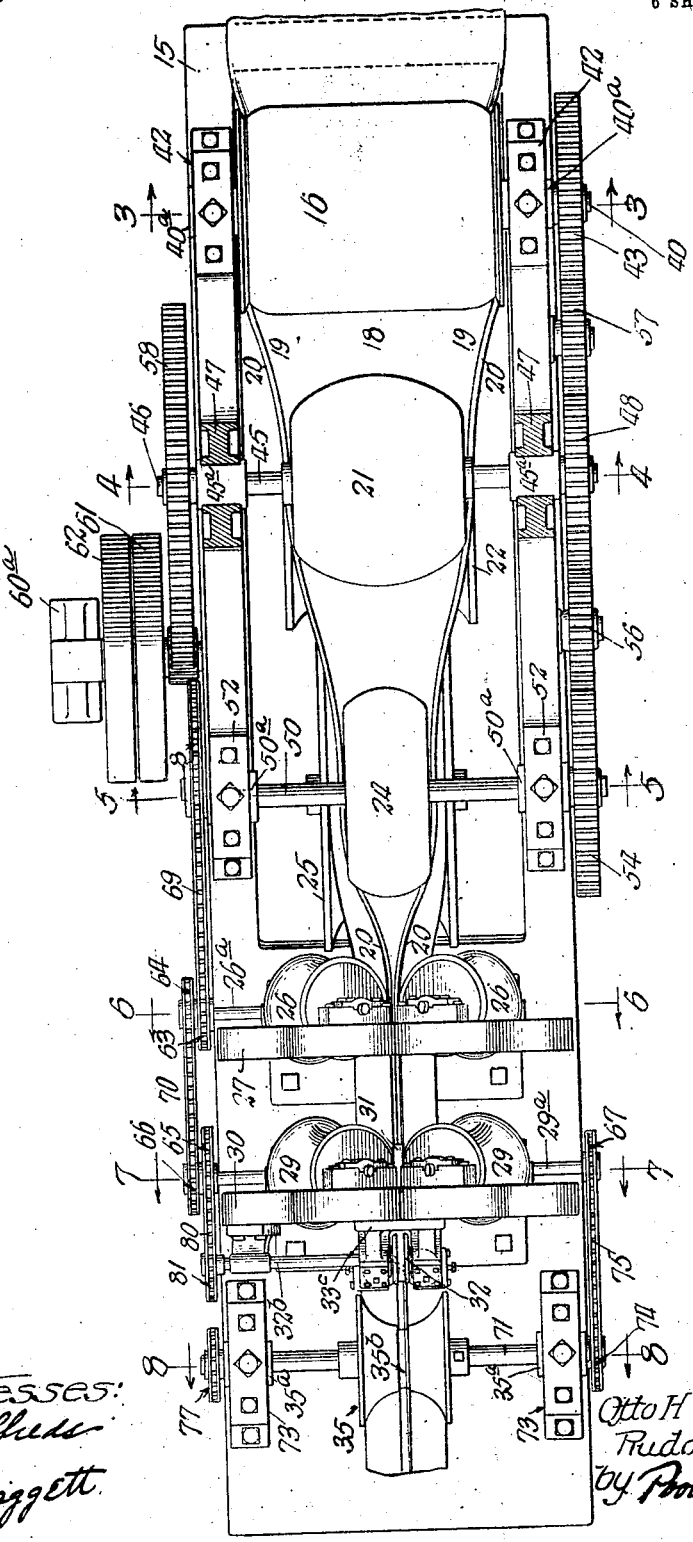
Figure 3:
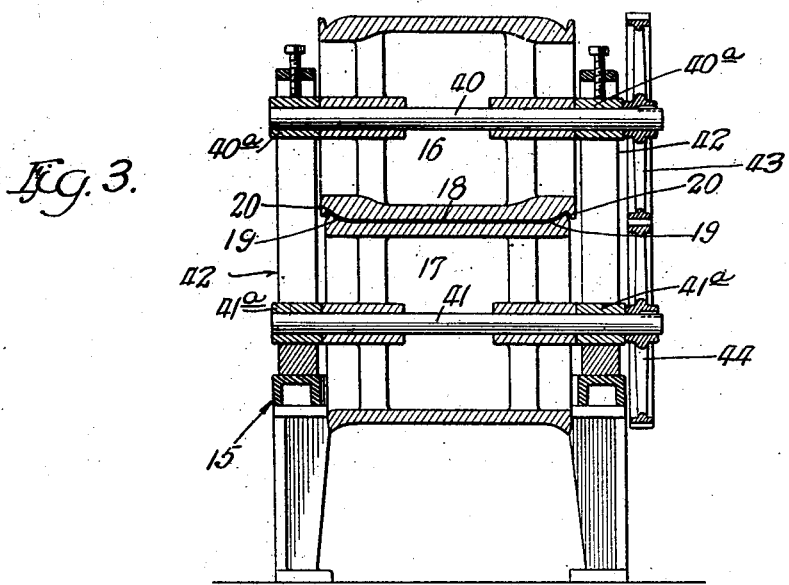
Figure 4:
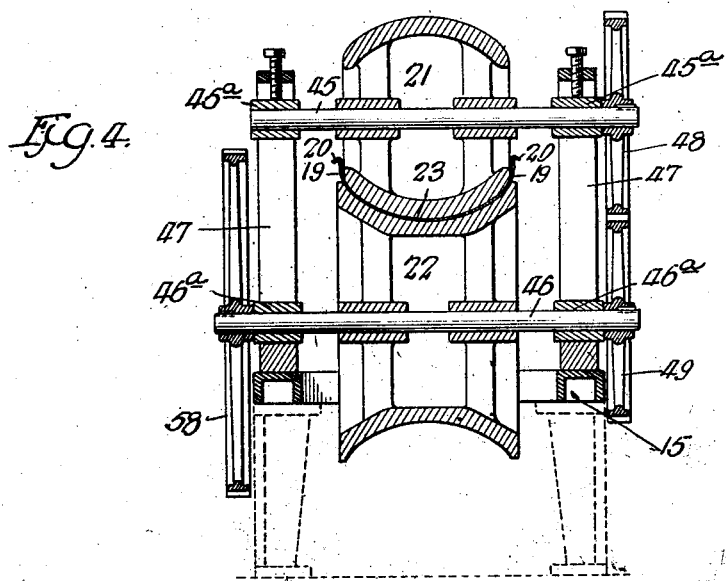
Figure 7:
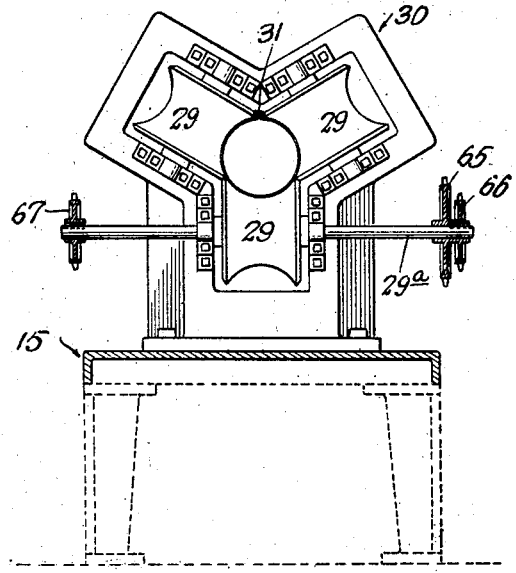
Figure 8:
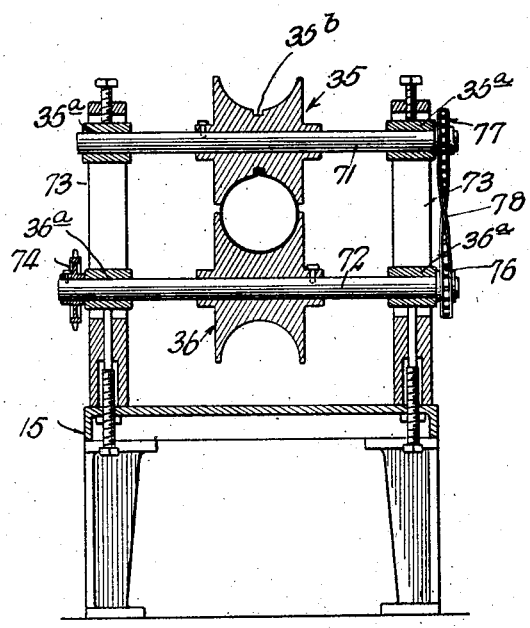

In the drawings:—Figure 1 is a side elevation of our improved machine. Fig. 2 is a top plan view of the same. Fig. 3 is a vertical section through Fig. 2, on the line 3—3 thereof. Fig. 4 is a similar section on the line 4—4 of Fig. 2. Fig. 5 is a similar section on the line 5—5 of Fig. 2. Fig. 6 is a like section on the line 6—6 of Fig. 2. Figs. 7 and 8 are like sections of Fig. 2 on the lines, respectively, 7—7 and 8—8. Fig. 9 is a side elevation of the pressing and tuck-
ing rolls on an enlarged scale. Fig. 10 is a top plan view of the same. Fig. 11 is a vertical section through Fig. 9 on the line 11—11 thereof.

15 represents the base of the machine upon which the operating parts are mounted. These operating parts, as will presently appear, comprise series of sets of rollers arranged in progression along the bed of the machine and properly geared to act together. These rollers receive the flat piece of metal at one end of the machine as it is fed in a longitudinal direction to them, and then by their successive operations on the said sheet as different sections thereof are presented to them, finally roll the sheet into pipe form and deliver it at the rear end of the machine in its final form.

16, 17 represent the first pair of rollers which are of male and female formation and are best seen in Fig. 3. Said rollers are arranged on the frame of the machine with their axes transverse thereof, and have their peripheries so formed with respect to each other, that in their operation on the flat sheet of metal, its outer edges will be curved up from the horizontal and at the same time turned backward so as to give said sheet the form in transverse section, indicated at 18, in which section 19 represents the curled up longitudinal edges of the sheet, and 20 indicates the flanges formed at the outer edges of said curved sections. The section of the rollers 16, 17 in a plane through their axes is such that the curved portions 19 of the sheet are formed on a radius which is equal to the radius of the pipe when finally finished, so that so much of the curvature of the pipe is completed in the operation of this first set of rollers. From this set of rollers the pipe-forming sheet passes to the next set of rollers 21, 22, the sections of which are best seen in Fig. 4. Said rollers are also male and female and are arranged with their axes transverse to the direction in which the pipe-forming sheet is being fed as before, and their peripheries are of such shape in cross-section that the sheet, when rolled between them, will be bent up into substantially the shape indicated at 23. It will be noted that the sides of the pipe-forming sheet, in which the flanges 20 and the finally formed curved portions 19 are made, project beyond the limits of the engaging surfaces of these rollers, and these rollers put curvature, approaching the final curvature, of the pipe, into that section of the pipe-forming sheet lying between said curved portions 19. From said rollers the pipe-forming sheet passes between the male and female rollers 24, 25 which are arranged next in order on the frame of the machine with their axes transverse to said frame. The engaging surfaces of these rollers are formed with a section transverse to the direction of the feed of the pipe-forming sheet having a curvature with a radius still more approaching the radius of the finished pipe.

It is to be noted that the upper roller 24 is made shorter than the lower roller 25 in order to allow room for the curved portions 19, 19 which curl up about its ends. This pair of rollers carries the process as far as it may be carried by means of two male and female rollers, as it is apparent from a consideration of Fig. 5, that any further bending of the pipe-forming sheet would leave no room for the operation of an upper roller. For this reason the next stage of the process is carried on by the use of a set of three rollers which act on the outside of the pipe-forming sheet alone. This next set of rollers is best to be seen in Fig. 6, in which 26 represents the rollers and 27 the frame in which they are carried. Said rollers are arranged with their axes at angles of 60° to each other in a vertical plane at right angles to the bed of the machine. Each of the lower ends of the upper rollers contact with the ends of the lower roller at one point on their edges, so that the three together, by their peripheries, form a circle closed at every point except at the top, as the upper ends of the top rollers do not quite touch, as is to be seen at 28. When the pipe-forming sheet is passed between this set of three rollers the pipe-forming sheet is approximated to the final form of the pipe and is ready for delivery to the next set, which is another set of three rollers similar to the set shown in Fig. 6, with the exception that the upper edges of the ends of the upper rollers are brought still more closely together so as to finally bring the flanged edges of the pipe-forming sheet together, as indicated in Fig. 7, wherein 29 represents the rollers and 30 the supporting frame.

A U-shaped strip of metal 31 is so fed to the machine by any convenient mechanism or by hand if desired, that when the pipe-forming sheet reaches this last set of three rollers 29, the legs of the strip will straddle the flanges of the pipe-forming sheet, as in the U-shaped piece embracing the flanges thereon then passes to the pressing and tucking rollers now to be described. These are best to be seen in Figs. 9, 10 and 11. They comprise a pressing roller 32 which is adapted to bear on top of the strip 31 and hold it down in contact with the flanges at the edge of the pipe-forming sheet, and two tucking rollers 33 arranged at each side of, and a little to the rearward of, said pressing roller which engage the outer faces of the legs of the U-shaped strip 31 and tuck them under the flanges 20 on the pipe. The axes of the tucking rollers or disks 33 are arranged in a vertical plane at right angles to the longitudinal axis of the machine, and said plane is slightly in the rear of the horizontal axis of the pressing roller 32 so that said pressing roller can act to depress the U-shaped strip down on the flanges before the pipe is delivered to the action of the tucking rollers or disks 33. A groove 32$^a$ is formed in the periphery of the roller 32 to receive and guide the U-shaped strip 31.

32$^b$ indicates the horizontally arranged shaft for the roller 32, and 33$^b$ the vertically arranged shafts for the tucking rollers or disks 33. Said shafts are suitably mounted in a standard 33$^c$ which is secured to the rear of the vertical standard 30.

From the tucking and pressing rollers the now finished pipe is delivered to a set of two rollers 35, 36 which are arranged one above the other with their axes transverse to the frame of the machine and in horizontal planes. Their peripheries are formed with grooves so that the two rollers together make a complete circle of the diameter of the completed pipe. The upper roller 35 is provided with a small groove 35$^b$ which gives room for the passage of the binding strip which engages the flanges of the pipe. These rollers are delivery rollers and they serve to draw the pipe from the machine and deliver it therefrom.

Passing now to a more detailed description of the construction of the machine, the rollers 16 and 17 are mounted, respectively, on shafts 40, 41 which are journaled in blocks 40$^a$, 41$^a$ located in standards 42 which are secured to the bed of the machine.

43, 44 represent intermeshing gears secured to the ends, respectively, of the shafts 40, 41. The rollers 21, 22 are similarly mounted on shafts 45, 46 journaled in block 45$^a$, 46$^a$ which are located in standards 47, the shafts being geared together by means of gear wheels 48, 49. The rollers 24, 25 are likewise mounted on shafts 50, 51 journaled, respectively, in blocks 50$^a$, 51$^a$, which are mounted in standards 52 secured to the bed of the machine and geared together by means of gears 54, 55.

56, 57 represent idle gears interposed, respectively, between the gears 55 and 49 and between the gears 49 and 44. All of these gears are driven from the shaft 46 to which is keyed the large gear 58 which meshes with a small driving pinion 59 mounted on a stub shaft 60 journaled at the side of the bed of the machine in the standard 60ª. At the end of the shaft are provided fixed and loose pulleys 61, 62.

The lower one of the set of rollers 26 has its shaft 26ª prolonged beyond the supporting frame 27 where it has keyed to it two sprocket wheels 63, 64. The lower one of the set of rollers 29 has its shaft 29ª prolonged at each end beyond the supporting frame 30 and has secured at one end the sprocket wheels 65, 66 and at the other end the sprocket wheel 67. A large sprocket wheel 68 is keyed to the end of the shaft 51 of the roller 25. The sprocket 68 is geared to the sprocket 63 by means of a sprocket chain 69 and the sprocket 64 is geared to the sprocket 66 by the sprocket chain 70. The sprocket 65 is geared by a chain 80 to a sprocket 81, secured to the end of the shaft 32ᵇ of the pressing roller 32. The rollers 35, 36 are journaled by means of the shafts 71, 72, respectively, in blocks 35ª, 36ª which are mounted in standards 73 secured to the bed of the machine. The shaft 72 is provided with a sprocket 74 which is geared by means of the sprocket chain 75 to the sprocket wheel 67. The two shafts 71, 72 are geared together by means of the sprocket wheels 76, 77, and the crossed sprocket chain 78.

It will be seen from this description that all of the rollers are geared together so as to rotate in unison, and the various gears, and sprocket wheels, are so related, as to their respective sizes, that the surface speed of all the rollers is the same throughout the machine. It is apparent that this is essential as the several rollers may be acting upon different lengths of the same pipe, and in the case of pipes which are as long as the bed of the machine, necessarily must act on different sections of the pipe, at one and the same time, so that the speed of the rollers must be timed to draw each section of the pipe along at the same rate.

The various parts of the machine are secured together in any convenient or usual manner, and it is not thought that a further description in this respect is necessary, as they are clearly illustrated in the drawings and are apparent to any mechanic.

The machine is quite simple in operation and it will be apparent that the pipe is formed from a flat pipe-forming sheet of the desired width which is fed to the machine at one end as such, and which is delivered from the machine at the other end in the form of the completed pipe. The formation of the pipe from the pipe-forming sheet is a gradual one, the machine in a sense approximating the action of the human hands if they were used to form a roll of pipe from a flat sheet of malleable material.

While we have illustrated in the drawings certain mechanical details of construction and have shown therein one embodiment of our invention, we do not wish to be limited to the particular construction illustrated as it is apparent that it may be modified without departing from the spirit of our invention.

We claim as our invention:—

1. A machine for rolling pipe from a flat piece of metal and for locking in place a U-shaped strip of metal which engages lateral flanges formed on the pipe-forming sheet, comprising a series of sets of rollers adapted to receive and successively act upon the pipe-forming sheet, said rollers being formed to bend the pipe-forming sheet transversely of its length and being adapted to curve said sheet in progressive degrees as the pipe-forming sheet is successively acted upon by them until the pipe is completely formed with the action of the last set of rollers, the first set of rollers being adapted to form lateral, oppositely disposed flanges on the pipe-forming sheet, and tucking mechanism adapted to apply the U-shaped strip to the flanges formed on said pipe-forming sheet, located in the rear of the last set of pipe-forming rollers, said tucking mechanism comprising a pressing roller adapted to press the U-shaped strip in place, and tucking rollers arranged at each side of said pressing roller adapted to tuck the legs of said U-shaped strip under the said flanges.

2. A machine for rolling pipe from a flat piece of metal and for locking in place a U-shaped strip of metal which engages lateral flanges formed on the pipe-forming sheet, comprising a series of sets of rollers adapted to receive and successively act upon the pipe-forming sheet, said rollers being formed to bend the pipe-forming sheet transversely of its length and being adapted to curve said sheet in progressive degrees as the pipe-forming sheet is successively acted upon by them until the pipe is completely formed with the action of the last set of rollers, the first set of rollers being adapted to form lateral, oppositely disposed flanges on the pipe-forming sheet, and tucking mechanism adapted to apply the U-shaped strip to the flanges formed on said pipe-forming sheet, located in the rear of the last set of pipe-forming rollers, said tucking mechanism comprising a pressing roller adapted to press the U-shaped strip in place, and tucking rollers arranged at each side of said pressing roller adapted to tuck the legs of said U-shaped strip under the said flanges, the said pressing roller being arranged to act in advance of said tucking rollers.

3. A machine for rolling pipe from a flat sheet of metal, comprising a series of sets of rollers adapted to receive and successively act upon the pipe-forming sheet to bend the same transversely of its length, the several sets being adapted to curve said sheet in progressive degrees as the pipe-forming sheet is successively acted upon by them, the first set of rollers comprising male and female rollers adapted to form lateral flanges on the pipe-forming sheet and to curve said sheet adjacent said flanges, the succeeding set of rollers being also of male and female formation to act on both sides of the pipe-forming sheet and to curve the same intermediate the lateral curves formed by the first set of rollers, a third set of male and female rollers adapted to act on both sides of said pipe-forming sheet and still further curve the same, a fourth set of rollers comprising a plurality of rollers with their axes in a plane at right angles to the direction of the feed of the pipe-forming sheet, said rollers engaging the outside of the pipe-forming sheet only, and another set of similarly arranged and disposed rollers adapted to act on the outside of the pipe-forming sheet only and finally bring the flanges formed on said pipe-forming sheet together and produce the final curvature of the pipe, together with a set of delivery rollers adapted to engage the outside of the finished pipe and draw it from the machine.

4. A machine for rolling pipe from a flat sheet of metal, comprising a series of sets of rollers adapted to receive and successively act upon the pipe-forming sheet to bend the same transversely of its length, the several sets being adapted to curve said sheet in progressive degrees as the pipe-forming sheet is successively acted upon by them, the first set of rollers comprising male and female rollers adapted to form lateral flanges on the pipe-forming sheet and to curve said sheet adjacent said flanges, the succeeding set of rollers being also of male and female formation to act on both sides of the pipe-forming sheet and to curve the same intermediate the lateral curves formed by the first set of rollers, a third set of male and female rollers adapted to act on both sides of said pipe-forming sheet and still further curve the same, a fourth set of rollers comprising a plurality of rollers with their axes in a plane at right angles to the direction of the feed of the pipe-forming sheet, said rollers engaging the outside of the pipe-forming sheet only, another set of similarly arranged and disposed rollers adapted to act on the outside of the pipe-forming sheet only and finally bring the flanges formed on said pipe-forming sheet together and produce the final curvature of the pipe, and tucking mechanism arranged to act after said above named last mentioned set of rollers, the same comprising a pressing roller with its axis at right angles to the axis of the machine, and its periphery tangential to the path of the flanges on the pipe-forming sheet, and tucking rollers arranged at each side of said pressing roller and slightly in the rear thereof with their axes at right angles to the bed of the machine, the peripheries of said tucking rollers being beveled at their edges.

In testimony that we claim the foregoing as our invention we affix our signatures in the presence of two witnesses, this 5th day of June A. D. 1909.

OTTO H. TAESCHNER.
RUDOLPH E. WIRTH.

Witnesses:
CLARENCE E. MEHLHOPE,
GEORGE R. WILKINS.